May 13, 1930. V. J. BURNELLI 1,758,498
AIRPLANE
Filed Jan. 6, 1921 3 Sheets-Sheet 2
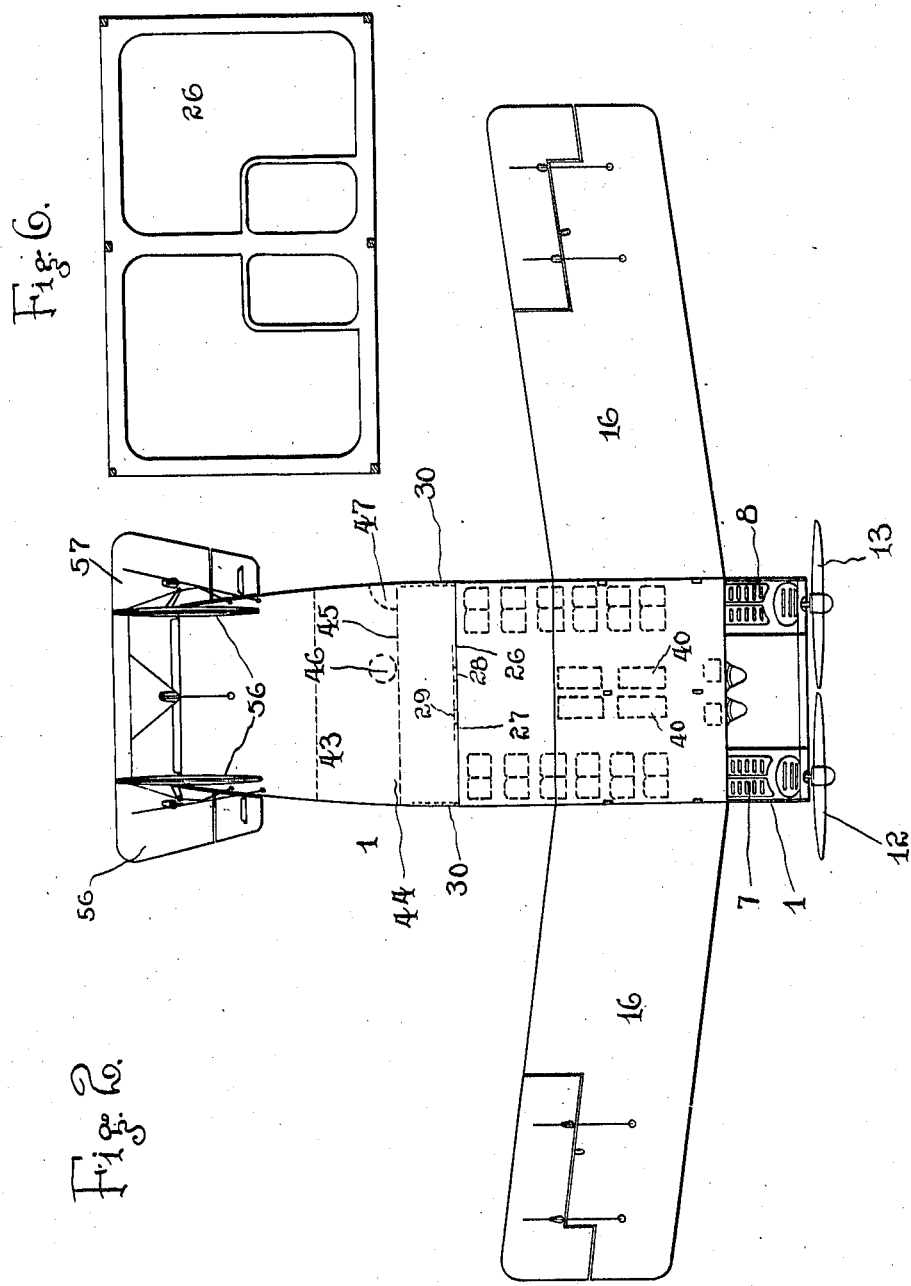

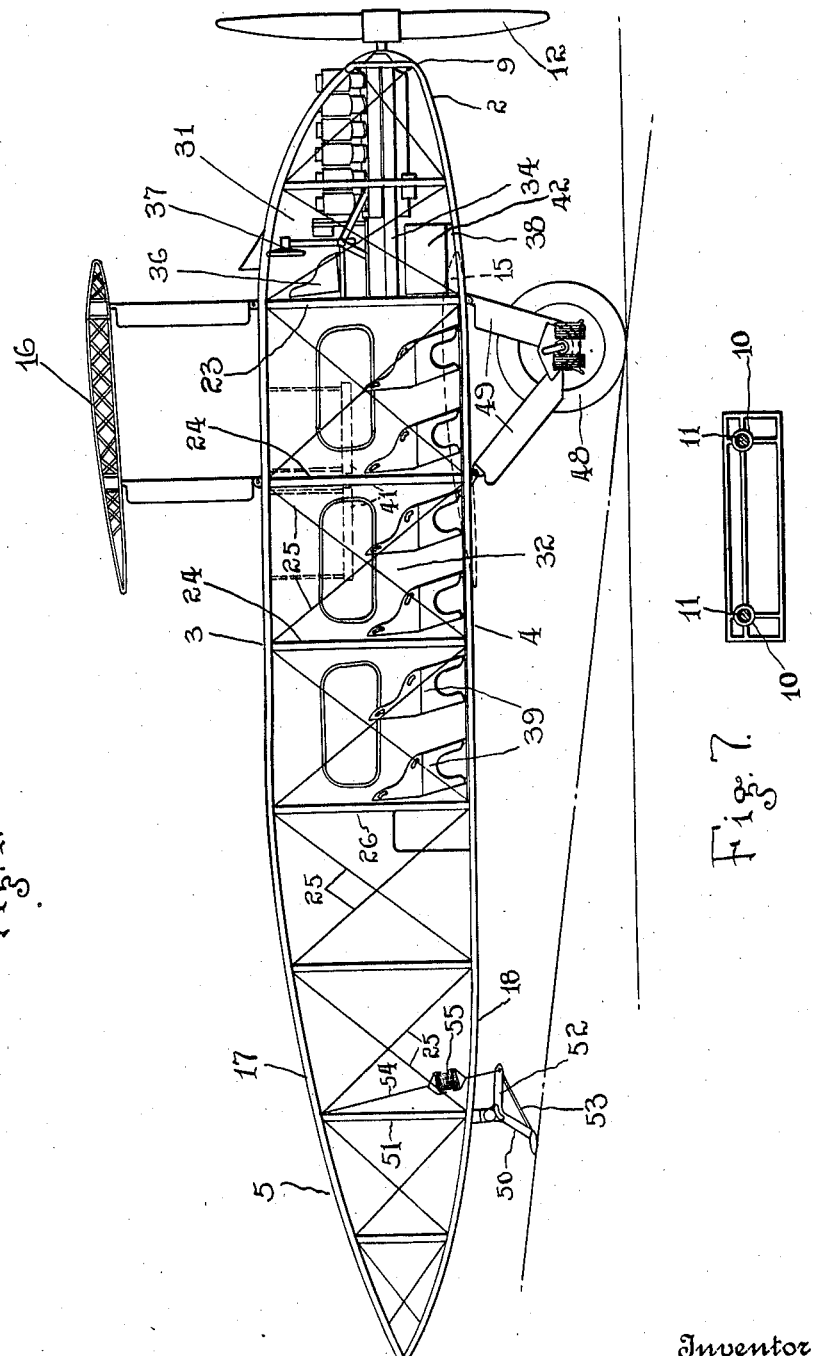

May 13, 1930.  V. J. BURNELLI  1,758,498
AIRPLANE
Filed Jan. 6, 1921  3 Sheets-Sheet 3
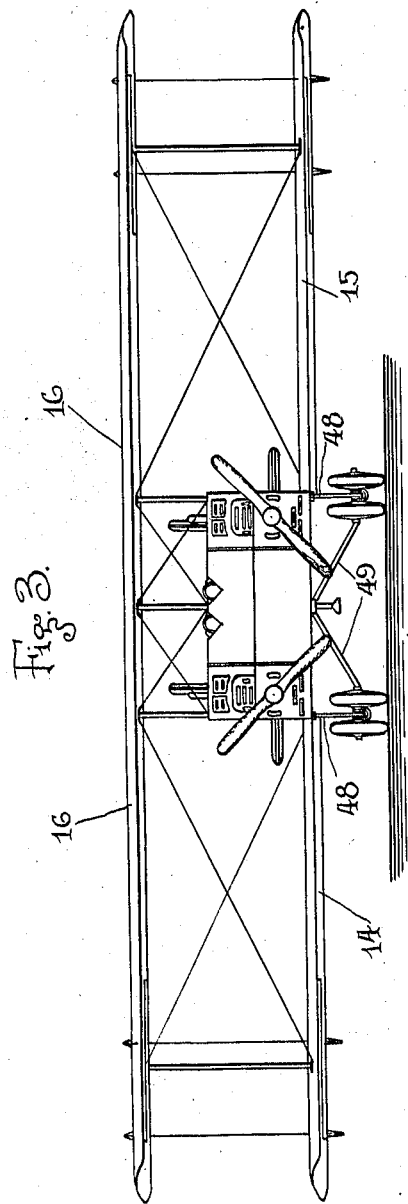
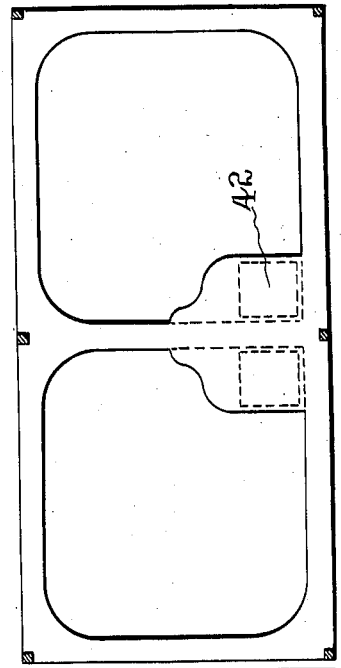
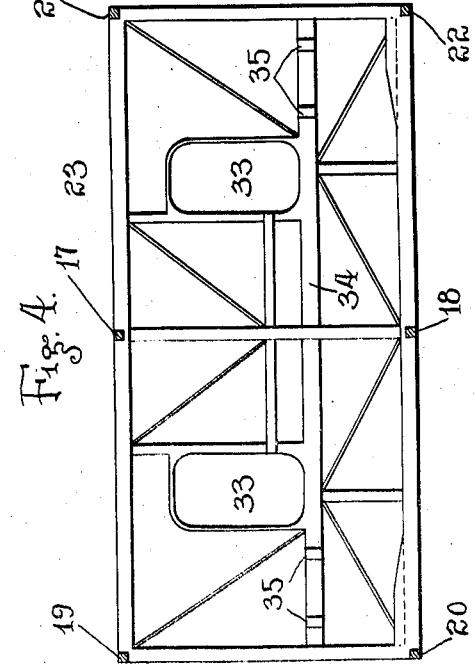

Patented May 13, 1930

1,758,498

UNITED STATES PATENT OFFICE

VINCENT J. BURNELLI, OF LINCOLN, NEBRASKA, ASSIGNOR, BY DIRECT AND MESNE ASSIGNMENTS, TO R. B. PATENT CORPORATION, OF NEW YORK, N. Y.

AIRPLANE

Application filed January 6, 1921. Serial No. 435,481.

This invention relates to airplanes and my improvements are directed to a novel type of heavy load or passenger carrying machine, having multiple power plants, wherein head resistance has been reduced to a minimum, the motors being housed within the fuselage which is of extended width, and whose upper and lower surfaces resemble those of a deep aerofoil, to be complementary with and permit the employment of relatively short span lateral supporting wings.

There is further comprehended in my invention the feature that the ample width of the deep, aerofoil shaped fuselage enables a number of separate engines to be contained within said fuselage, with their propellers operating in the same vertical plane, close to the centre of resistance; and also that unusual lateral extent of cabin area is provided for passenger and other accommodations.

Further, the fuselage, having considerable length, is amplified in its roominess, and provides broad, wing-like, rearwardly extended surfaces that constitute an admirably efficient longitudinally stabilizing element; the upper and lower surfaces thereof merging into a trailing edge, from which there extends an empennage composed of vertical rudders and an elevator.

Assuming two motors to be employed with this machine they are disposed respectively at opposite sides within the forward portion of the aerofoil-fuselage, in which positions they receive support from the relatively great structural strength of the fuselage framework, instead, as is usual with twin motored machines, of imposing their respective weights and vibrational influences upon the relatively weaker structure of the lateral supporting wings.

Also, the wide extent of the aerofoil-fuselage permits the landing gear, of full tread, to be attached thereto and to depend therefrom within the compass of vertical planes bounding the fuselage side walls, so that the shocks and strains to which the landing gear is subjected may be communicated solely to the fuselage structure.

Other features and advantages of my invention will hereinafter appear.

In the drawing:—

Figure 1 is a side sectional elevation of my improved airplane, the empennage not appearing in this view.

Fig. 2 is a top plan view of the complete airplane, the arrangement of passenger seats within the aerofoil-fuselage being indicated in dotted lines.

Fig. 3 is a front elevation of Fig. 2.

Fig. 4 is an enlarged elevation of a panel bulkhead between the pilot's compartment from the passengers' cabin, with means of access.

Fig. 5 is a similar view of an arch type of bulkhead.

Fig. 6 is a similar view of the rearmost cabin bulkhead.

Fig. 7 is a front detail view of the nose plate for the leading edge of the aerofoil fuselage.

In carrying out my invention I provide a fuselage 1 in the form of an internally braced, hollow wing, of relatively large dimensions and having true aerofoil contours throughout. In the example thereof shown in the drawings this fuselage-wing has the leading edge portion 2, upper surface 3, lower surface 4, and rear portion 5. The width of the wing 1 is, as shown in Figs. 2 and 3, 4, 5 and 6, considerably greater than its height, thereby providing an aerodynamically efficient supporting element having a wide nose portion and also being sufficient for the containment within its leading edge portion of two independent motors 7, 8, which are respectively positioned at opposite sides within said leading edge portion, whose front frame or plate 9 is provided with bearings 10 for the propeller shafts 11, the propellers 12, 13, carried by said shafts, being operated respectively by the engines 7, 8. The propellers are disposed to rotate, oppositely, in the same vertical plane, this arrangement requiring that the engines must be spaced apart, within the leading edge portion of the fuselage wing, a sufficient extent so that the propeller radii will have spaced relation. Nevertheless it is my purpose, and a function of the two engine housing by the fuselage-wing, that the lines of propeller thrust shall be close to the longitudinal axis of the airplane, to be near the centre of resistance, thereby avoiding a heavy turning moment in the event of flying with one motor.

While the lift afforded by the aerofoil-fuselage is considerable, said aerofoil fuselage is intended to comprise a central section in the supporting system of wings, and to embody a structure possessed of strength for the absorption of the major strains and stresses of the airplane, and also the engine vibrations.

Additional supporting wings 14, 15, extend out laterally from opposite sides of the central wing 1, the wings 1 and 14, 15 being complementary to each other and together comprising a support unit; but the large amount of lift afforded by wing 1, together with the reduction in head resistance due to the aerofoil contour of the fuselage and the absence of outrigged motors with their nacelles, in a plural motored craft, all contribute to the delimitation of supporting area required for the wings 14, 15, which can thus be of relatively short span.

Although in the example of airplane illustrated, its form is that of a bi-plane, having the upper wing 16, quite obviously the advantages referred to hold good also for a monoplane or multiplane, the reduced span and small aspect ratio of the side wings 14, 15 being equally characteristic of superposed supporting units in the instance of an airplane having a central aerofoil-fuselage like that herein shown.

The aerofoil-fuselage may be composed of longérons, transverse panels or bulkheads and trussing, with veneer covering. In the example three pairs of longérons are shown, one pair of longérons 17, 18 lying respectively along the central upper and lower surfaces of the aerofoil-fuselage, and other pairs, 19, 20, and 21, 22, lying respectively along the upper and lower sides thereof.

Bulkheads 23, 24, constituting transverse compression members, are arranged suitable distances apart, in the cabin and motor sections of the aerofoil-fuselage, to obviate the use of cross wire trussing, which would interfere with the free movements of passengers and crew. Otherwise internal bracing is effected by means of trussing 25.

A rearmost panel 26 for the cabin compartment may have the doorways 27, 28 respectively at opposite sides of the central longitudinal trussing, for ingress and egress, and the panel or bulkhead enclosed section 29 of the aerofoil-fuselage may have a doorway 30 in its side to serve as a main entrance and exit.

The engine compartment or pilot house 31 is separated from the passenger cabin 32 by the bulkhead 23, with doorways 33 therethrough; said compartment having the raised platform 34, upon which the mounts or beds 35 for the motors 7, 8 are supported, and said compartment containing, above platform 34, the pilots' seats 36 and control means 37.

In the space 38 beneath platform 34, mail matter or other cargo may be stowed.

The cabin 32 is provided with forwardly facing passenger seats 39 along each side wall thereof, there remaining more than ample gangway between each row of seats and the central trussing that extends through the longitudinal centre of the cabin and therefore I provide lounge seats 40 which back up against said central trussing. These lounge seats may also serve as sleeping berths; and upper, folding berths 41 may be carried by or suspended from the central upper longéron 17.

The passenger cabin section of the aerofoil-fuselage occupies the centre of gravity position in the airplane and therefore I prefer to locate the fuel load, being a variable, in that section. The fuel may be stored in tanks 42 built in beneath the lounge seats.

Since cargo in the space 38 comprises an off centre load, this may be balanced by the weight of passengers, baggage or other cargo contained between the bulkheads 26 and 43 at the rear of the cabin compartment, also toilet and lavatory conveniences. Thus, at one side of the central longitudinal trussing a trunk room 44 may be provided, there being a rooom 45 at the other side with toilet 46 and lavatory 47. This arrangement is, however, of an arbitrary nature, the purpose being to provide passenger conveniences of the character indicated for suitable load distribution.

Landing gear, as 48, with its trussing 49, is attached direct to the aerofoil-fuselage, and, while of full tread width, is enabled to lie completely beneath said aerofoil-fuselage, being secured and trusssed solely thereto, so that all the shocks, strains and stresses received by said landing gear are concentrated in the region of the fuselage, whose frame structure is of requisite strength for the purpose. This arrangement prevents the imposition of landing gear strains and vibrations upon the side wings 14, 15, such as occur under the present practice of twin-engine machines, with which excessive landing gear strains are apt to seriously affect the wing trussing.

In this connection, it will be apparent that since vibration materially affects the life of wing materials, therefore outrigged motors on side wings, which also have the landing gear trussed thereto, require such wings to have great extra strength and weight, all piling up resistance, which can be measurably avoided by the centralizing means for all strains and vibrations available through the improved aerofoil-fuselage of this invention.

The tail skid 50 is mounted on the lower central longéron 18, which is stiffened by a steel tube 51 which connects it with the upper central longéron 17, said tail skid having a forwardly angled arm 52, trussed thereto with tension wire 53. Said tail skid is also connected to the upper side longérons 19, 21, by cable connections 54 engaging the arm 52, an elastic element 55 being introduced in said connections 54 to absorb shocks.

The empennage, which is attached to the trailing edge of the aerofoil-fuselage, includes the vertical rudders 56, and elevator 57, the latter extending over the full width of the aerofoil-fuselage, and thereby constituting a monoplane elevator of sufficient span to give ample control.

It will be appreciated that my improved airplane herein described is devised to have a high order of aerodynamic efficiency, the elements thereof being co-ordinated to accord sturdiness, while reducing drift to a minimum and providing an unusual degree of lift in a craft of relatively small span, while the flat effect of the broad and long aerofoil-fuselage admirably takes the place and answers the purpose of a stabilizer.

Variations within the spirit and scope of my invention are equally comprehended herein.

I claim:—

1. The combination, in an airplane, of a body portion having aerofoil contour throughout, with its leading edge of full width, motors enclosed respectively at opposite sides within said leading edge, and a useful load enclosing compartment located in an intermediate section of the aerofoil disposed in the centre of gravity of the airplane.

2. The combination, in an airplane, of a body portion having aerofoil contour throughout, with its leading edge of full width, motors enclosed respectively at opposite sides within said leading edge, complementary supporting elements extended from opposite sides of said body portion, and a useful load enclosing compartment located in an intermediate section of the aerofoil disposed in the centre of gravity of the airplane.

3. An airplane having an aerofoil element in fuselage form, with its leading edge of full width and its length extended to the empennage for longitudinal stability, the portion of said aerofoil lying in the centre of gravity having passenger accommodation, and fuel containing means, propulsive power means housed in said leading edge, pilot and load accommodations between the power means and passenger accommodation, and balance load accommodation at the rear of the passenger accommodation.

4. An airplane having an aerofoil element in fuselage form, with its leading edge of full width and its length extended to the empennage for longitudinal stability, the portion of said aerofoil lying in the centre of gravity having passenger accommodation, and fuel containing means, propulsive power means housed in said leading edge, pilot and load accommodations between the power means and passenger accommodation, balance load accommodation at the rear of the passenger accommodation, and complementary aerofoils extended at opposite sides from said aerofoil-fuselage.

5. An airplane having a central, aerodynamically efficient supporting element which constitutes a fuselage of aerofoil contour throughout, whose width is considerably greater than its height throughout substantially the entire length thereof and whose upper and lower surfaces are transversely rectilineal, the upper surface being generally convex longitudinally and of considerably greater length than its lower surface, said fuselage containing a power plant enclosed in the forward portion thereof, propeller shafting projecting thru the leading edge of the fuselage and operatively connected to said power plant and propeller means carried by said shafting, and disposed in front of the leading edge of the fuselage.

6. An airplane having a fuselage of aerofoil contour whose width is considerably greater than its height throughout the major portion of its entire length thereby providing an aerodynamically efficient supporting element having a wide nose portion, said fuselage carrying a power plant disposed in close proximity to the nose portion, a plurality of shafts disposed on opposite sides of the longitudinal axis of the fuselage and in proximity thereto said shafts being operatively connected to said power plant and a propeller carried by the front end of each of said shafts and disposed adjacent the front of said nose portion of the fuselage thereby serving as tractor propellers.

7. An airplane whose body portion enclosingly contains the full power equipment and useful load, said body portion being of greater width than height the upper surface being generally convex longitudinally and of considerably greater length than its lower surface and having aerofoil contour throughout with its length extended to the empennage for longitudinal stability, to thus constitute an aerodynamically efficient supporting element, and complementary supporting elements extended from opposite sides of said central element.

Signed at Lincoln in the county of Lancaster and State of Nebraska this 29th day of December A. D. 1920.

VINCENT J. BURNELLI.